United States Patent [19]

Ide et al.

[11] Patent Number: 4,646,564
[45] Date of Patent: Mar. 3, 1987

[54] METHOD FOR TESTING GAS DIFFUSION AND APPARATUS FOR SAME

[75] Inventors: Yasuo Ide; Kimio Ogushi; Kazuhiro Yamauchi, all of Nagasaki, Japan

[73] Assignee: Mitsubishi Jukogyo Kabushiki Kaisha, Japan

[21] Appl. No.: 801,132

[22] Filed: Nov. 21, 1985

[30] Foreign Application Priority Data

| Feb. 19, 1984 | [JP] | Japan | 59-185936 |
| Dec. 4, 1984 | [JP] | Japan | 59-256261 |
| Feb. 19, 1985 | [JP] | Japan | 60-31302 |
| Feb. 19, 1985 | [JP] | Japan | 60-22433 |
| Apr. 4, 1985 | [JP] | Japan | 60-71483 |

[51] Int. Cl.$^4$ .................................. G01M 9/00
[52] U.S. Cl. ............................. 73/147; 73/865.6
[58] Field of Search ........................... 73/147, 432 SD

[56] References Cited

FOREIGN PATENT DOCUMENTS 0206844 12/1982 Japan ............................. 73/147
0105034 6/1983 Japan ............................. 73/147

OTHER PUBLICATIONS

Kareem et al., "Wind-Tunnel Simulation of Wind-Structure Interactions", ISA Transactions-vol. 18, No. 4, pp. 23-41 (1979).

Primary Examiner—Donald O. Woodiel
Attorney, Agent, or Firm—McGlew and Tuttle

[57] ABSTRACT

The present invention is connected with a method for testing a gas diffusion which comprises the steps of rotatably disposing a topography model in the wind passage of a wind tunnel; previously establishing a time distribution of a direction and a velocity of a wind blowing above the topography model; rotating the topography model on the basis of the established time distribution of the blowing wind; discharging a tracer gas from a certain position of the topograph model while changing the wind velocity in the wind tunnel; and testing a diffusion of the tracer gas. Further, the present invention is connected with an apparatus for practicing the above-mentioned method and is concerned with a method for testing a gas diffusion which comprises fixing a topography model in a wind passage of a wind tunnel; and rotating the wind passage about the topography mold on the basis of a time distribution of a wind direction. Furthermore, the present case is concerned with their improvements. According to the present invention, the time distribution of the wind direction and the wind velocity corresponding to weather conditions on an actual location can be reproduced on a laboratory scale, and it is thus possible to simulate situations of the gas diffusion effectively.

7 Claims, 14 Drawing Figures

METHOD FOR TESTING GAS DIFFUSION AND APPARATUS FOR SAME

BACKGROUND OF THE INVENTION

(i) FIELD OF THE INVENTION

The present invention relates to a method for testing a gas diffusion by simulating gas diffusion situations of nature on a laboratory scale, and an apparatus for this method.

(ii) DESCRIPTION OF THE PRIOR ART

Smoke discharged from chimneys and exhaust pipes of tunnels, heat taken out from cleaning towers and gases leaked out through LNG tanks are diffusively blown in a wind. In the case of simulating this phenomenon of nature in a laboratory, a wind tunnel is usually employed. Accordingly, for the simulation, the wind tunnel is provided in its interior with a topography model having chimneys, mountains, rivers and buildings and the like thereon.

Through the wind tunnel thus constituted, a wind is caused to flow, and a specific gas, e.g., a tracer gas is discharged from the miniature chimneys. At this time, an expansion of the gas is observed and measured by a color change test, a suction/gas analysis with the aid of a traverse, and the like.

In this case, for the purpose of accurately simulating the wind direction and the wind velocity, the topography model is rotatably disposed in the wind passage of the wind tunnel. According to the topography model, a gas diffusion test can be carried out by previously establishing the time distribution of the direction and the velocity of the wind blowing above the central portion of its rotation and rotating the topography model on the basis of the established time distribution.

Now, the test method just mentioned will be described in reference to FIGS. 2, 12 to 14 attached hereto.

In FIG. 14, an air flow 1 which has been generated by an air blower not shown and which has been rectified into a steady flow is blown into a wind passage 2 of a wind tunnel. A floor surface 3 of this wind passage 2 is provided at its central portion with a turntable 4 which is rotatably supported by a rotatable support device 12, the top surface of the turntable 4 being at the same level as the floor surface 3. In the vicinity of the center of this turntable 4, a miniature chimney 5 is planted through the turntable 4. Further, a topography model 6 comprising a building and the like is arranged on the turntable 4.

A circumferential plate 9 is projectively disposed under the turntable 4 and is further immersed at its end portion in a sealing liquid 10 pooled in a circumferential groove member 8, which is attached to the circumferential edge of an opening formed in the floor surface 3. Therefore, a space 11 between the floor surface 3 and the sealing liquid 10 is sealed with the latter so as to prevent air from leaking out therethrough. The turntable 4 can be rotated by a suitable means which is not shown, and a tracer gas 7 is discharged from the miniature chimney 5.

A wind velocity of the wind which blows above the topography model 6 provided on the turntable 4 and a rotation angle of the turntable 4 can be decided as follows: That is to say, the direction and the velocity of the blowing wind are observed during one day on a chimney-disposed site or a construction-planned site to prepare such a wind rose as in FIG. 2, and the rotation angle of the turntable 4 and the velocity the blowing wind are regulated so as to reproduce the wind direction and the wind velocity of the wind rose.

Smoke from the chimney or an exhaust nozzle of the tunnel and heat from a cleaning tower is generally blown up in the atmosphere, rises once and then flows leeward on the wind while diffused. Accordingly, an expansion of the exhaust smoke must be tested and measured by discharging the gas 7 corresponding to the exhaust smoke from a discharge opening 17 disposed at an effective chimney height (He=Ho +ΔH) of a height Ho of the miniature chimney itself 5 plus the total height ΔH of a height h1 of the upward blown smoke and a height h2 of the floatingly rised smoke. It is known that the height ΔH varies, as shown in FIG. 13, with smoke discharge conditions (a velocity of the upward blown smoke and a discharge flow rate) and the wind velocity. As a formula for representing the rise of the smoke, for example, the Bosanquet formula is already put into practice.

In the case of a conventional manner, the height of the miniature chimney is decided on the basis of a reduced scale rate of the topography, and thus it is impossible to carry out the diffusion tests at the variously changed discharge heights.

In general, the wind tunnel is fixed and the topography model in the wind passage also is stationary. Therefore, in the one test, the gas diffusion can only be tested and measured under a specific condition such as the blow of a south wind.

If the diffusion test is contemplated under the condition of a north wind in succession to the condition of the south wind, the topography model must be turned reversely in the wind tunnel. On this topography model, however, there are disposed a pipe for feeding the gas to the miniature chimney therethrough, a pipe for sucking the gas therethrough and the like, and thus returing the topography model reversely is difficult.

Consequently, in any conventional technique, each gas diffusion test must be carried out under each wind direction/wind velocity condition.

As understood from a wind indicator provided on a roof which we often see, the direction of the natural wind is not constant even for a short period of time, and the wind direction alters in an extensive range even for several hours.

When observed in detail, it will be perceived that not only the wind direction but also wind velocity also changes. Accordingly, the gas diffusion test taking the wind direction and the wind velocity in consideration is rightly necessary, but such a test has not be carried out heretofore. In addition thereto, a conventional apparatus for the gas diffusion test also is poor in reproducibility of the test conditions.

SUMMARY OF THE INVENTION

The present invention has been achieved in view of such situations.

(I) A general object of the present invention is to provide a method for testing a gas diffusion which comprises reproducing, on a laboratory scale, a wind direction and a wind velocity varying with time in compliance with weather conditions on an actual location in order to simulate gas diffusion circumstances and carrying out a gas diffusion test under such conditions.

(II) A more specific object of the present invention is to provide a method for testing a gas diffusion by the use of a discharge pipe which is capable of changing a height of its discharge opening each time a wind velocity is varied, when the test is carried out for one chimney having smoke discharge conditions previously decided.

(III) Another object of the present invention is to provide an apparatus for testing a gas diffusion by reproducing, on a laboratory scale, a wind direction and a wind velocity varying with time in compliance with weather conditions on an actual location in order to simulate gas diffusion circumstances, and carrying out a gas diffusion test under such conditions.

(IV) Still another object of the present invention is to provide an apparatus for testing a gas diffusion in which a discharge rate of a tracer gas is varied in compliance with a wind direction.

(V) A further object of the present invention is to provide an apparatus for testing a gas diffusion which has a tracer gas discharge pipe capable of changing its height in compliance with a wind velocity.

In order to accomplish the above-mentioned objects, the present invention is constituted as follows:

(I) A method for testing a gas diffusion which comprises the steps of rotatably disposing a topography model in a wind passage of a wind tunnel; previously establishing a time distribution of a direction and a velocity of a wind blowing on the topography; rotating the topography model by a rotating means on the basis of the time distribution; discharging a tracer gas from a predetermined position of the topography model by a tracer gas discharging means while changing the wind velocity in the wind tunnel by an air blowing means; and testing a diffusion state of the tracer gas.

(II) A method for testing a gas diffusion which comprises the steps of rotatably disposing a topography model in a wind passage of a wind tunnel; previously establishing a time distribution of a direction and a velocity of a wind blowing on the topography; rotating the topography model by a rotating means on the basis of the time distribution; discharging a tracer gas from a predetermined position of the topography model by a tracer gas discharging means while changing the wind velocity in the wind tunnel; and testing a diffusion state of the tracer gas; the method being characterized by setting a discharge height of the tracer gas at a predetermined level in compliance with the wind velocity by a height control means.

(III) A method for testing a gas diffusion which comprises disposing a topography model in a wind passage of a wind tunnel; discharging a tracer gas from a predetermined position of the topography model; and testing the diffusion state of the tracer gas; the method being characterized by rendering the topography mold stationary and the wind passage rotatable; previously establishing a time distribution of the direction of a blowing wind; and rotating the wind passage on the basis of the time distribution of the wind direction by a rotating means.

(IV) A method for testing a gas diffusion which comprises disposing a topography model in a wind passage of a wind tunnel; discharging a tracer gas from a predetermined position of the topography model; and testing the diffusion state of the tracer gas; the method being characterized by rendering the topography mold stationary and the wind passage rotatable; previously establishing a time distribution of the direction and the velocity of a blowing wind; rotating the wind passage on the basis of the time distribution of the wind direction by a rotating means; and changing the wind velocity in the wind passage by a wind blowing means.

(V) An apparatus for testing a gas diffusion which comprises a topography model rotatably disposed in a wind passage in a wind tunnel; a rotating means for rotating the topography model; a wind blowing means for blowing a wind into the wind tunnel; a gas discharge means for discharging a tracer gas from a predetermined position of the topography model; and a cotrol means for controlling the rotating means and the wind blowing means.

(VI) An apparatus for testing a tracer gas diffusion at various rotation angles of a topography model which comprises the topography model rotatably disposed in a wind passage of a wind tunnel; a rotating means for rotating the topography model; and a gas discharge means for discharging the tracer gas from a predetermined position of the topography model; the apparatus being characterized by further having a tracer gas discharge rate controlling means for controlling a discharge rate of the tracer gas.

(VII) An apparatus for testing a tracer gas diffusion at various rotation angles of a topography model which comprises the topography model rotatably disposed in a wind passage of a wind tunnel; a rotating means for rotating the topography model; and the tracer gas discharge pipe, uprightly disposed on the topography model, for discharging a tracer gas; the apparatus being characterized by further having a tracer gas discharge pipe lifting means for lifting the tracer gas discharge pipe in compliance with a wind velocity.

The present invention is constituted as described above, and thus the following effects can be obtained.

(I) According to the gas diffusion testing method and the apparatus for the method of the present invention, it is possible to reproduce, on the topography model on a laboratory scale, the time distribution of the wind direction and the wind velocity corresponding to weather conditions on an actual location.

As a result, gas diffusion circumstances under natural conditions on the certain site on which sources producing gases such as smoke, heated gas and LNG gas will be placed can be simulated and investigated.

(II) Heretofore, the gas diffusion in the wind for a chimney having an unchanged height can only be simulated, but according to the present invention, there can be simulated diffusion circumstances under natural conditions of the wind blowing in all the directions during, for example, one day or one month, in the case that a height of the rising smoke is altered by the wind velocity.

(III) In the gas diffusion testing apparatus of the present invention, the discharge rate of the tracer gas can be advantageously changed in response to the wind direction.

(IV) Further, in the gas diffusion testing apparatus of the present invention, the height of the tracer gas discharge pipe can be advantageously changed in compliance with the wind velocity.

DETAILED DESCRIPTION OF THE PREFERRED EMBODIMENT

Now, embodiments of the present invention will be described in reference to accompanying drawings.

Embodiment 1

Figure 1:
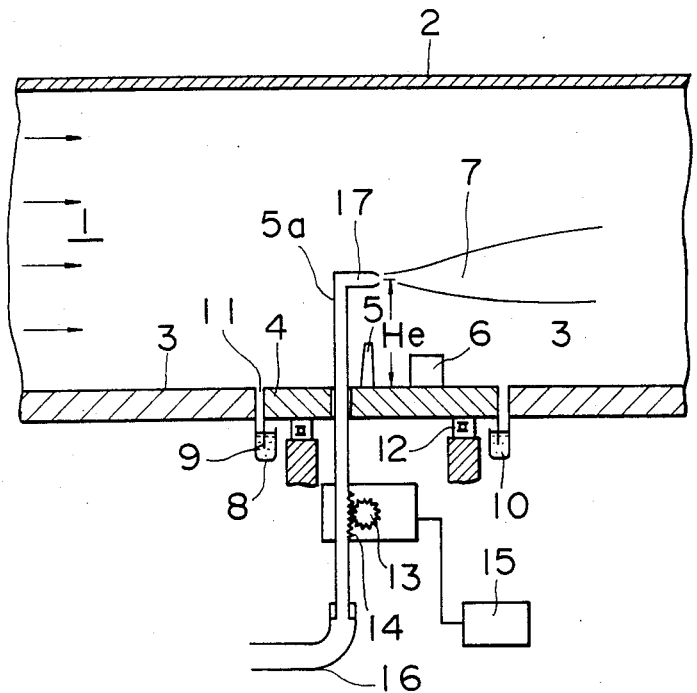
FIG. 1 is a schematically illustrative view of a testing apparatus used in a first embodiment of a gas diffusion testing method of the present invention.

In FIG. 1, a turntable 4 is supported by means of a rotatable supporting device 12 in the middle of a floor surface 3. On this turntable 4, there are planted a miniature chimney 5 formed in a reduced scale ratio of a shown topography and a discharge pipe 5a an effective height He of which can be changed in response to the change in a wind velocity. Around a suitable portion of the above-mentioned discharge pipe 5a, a sealing medium is used, whereby the pipe 5a can freely move upward and downward without allowing any gas to leak out. Further, the discharge pipe 5a is provided on its part with a rack 14 for enabling the pipe 5a to move upward and downward by the rotation of a gear 13, and is connected at its lower end portion to a pipe 16 for allowing a gas 7 to flow therethrough.

The gear 13 can be driven by a motor not shown, and the rotation of the motor can be controlled by a control device 15. Therefore, when the height of the discharge pipe 5a is changed with time, the information of the height change is previously stored in the control device 15. Accordingly, the information in the control device 15 commands the motor to rotate and to thereby drive the discharge pipe 5a upward and downward. The other devices are the same as in a conventional one.

Next, reference will be made to a method for testing a gas diffusion in accordance with a wind rose shown in FIG. 2.

Figure 2:
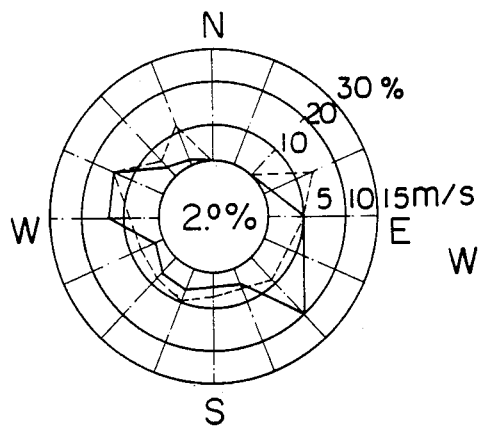
FIG. 2 is an exemplary wind rose showing a frequency distribution of a wind direction and an average wind velocity.

FIG. 2 exhibits a frequency distribution in 16 directions, and a solid line therein represents the frequency distribution in each wind direction and a dotted line represents an average velocity of the wind in each direction. Since the average wind velocity for each wind direction is known from the shown dotted line, the discharge height He can previously be calculated for each wind velocity, for example, by the use of the formula for representing the rise of smoke. The information regarding a relation between a retention time of each wind direction and the discharge height is previously stored in the control device 15.

For example, in the case that the gas diffusion of one day is tested in 30 minutes (1,800 seconds), a 1% wind direction frequency corresponds to 18 seconds. That is to say, the wind having the wind velocity shown by the dotted line in FIG. 2 is prepared in the wind tunnel. A discharge opening 17 is positioned at a level of the discharge height for this wind velocity, and the turntable 4 is rotated every 22.5° (360/16) in the 16 directions. In this case, each wind direction is maintained for a period of time corresponding to the wind direction frequency distribution of the wind rose in FIG. 2. For example, when the gas diffusion begins with a west wind, the west side of the discharge pipe 5a on the turntable 4 is oriented to the upstream side of the wind passage and the discharge opening 17 is set at a level of the discharge height He for the wind velocity for the test. After the wind in the wind tunnel has been stabilized, the gas 7 is discharged from the discharge opeining 17.

The test of the diffusion state of the gas 7 can be carried out, for example, by a color change test method.

The present invention can reproduce, on a laboratory scale, the time distribution of the wind direction and the wind velocity on the topography model in compliance with the weather conditions on an actual location. Further, according to the constitution of the present invention, the discharge height of the tracer gas can be positioned at the predetermined level in response to the wind velocity, whereby the diffusion state under natural conditions can be reproduced.

Embodiment 2

Figure 3:
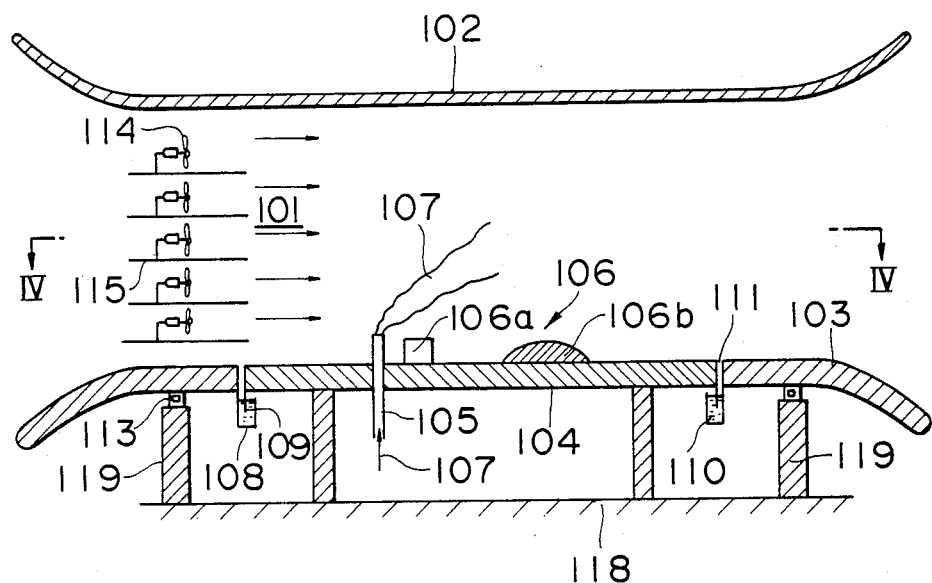
FIG. 3 is a vertical section of an apparatus used in a second embodiment of the gas diffusion testing method.
Figure 4:
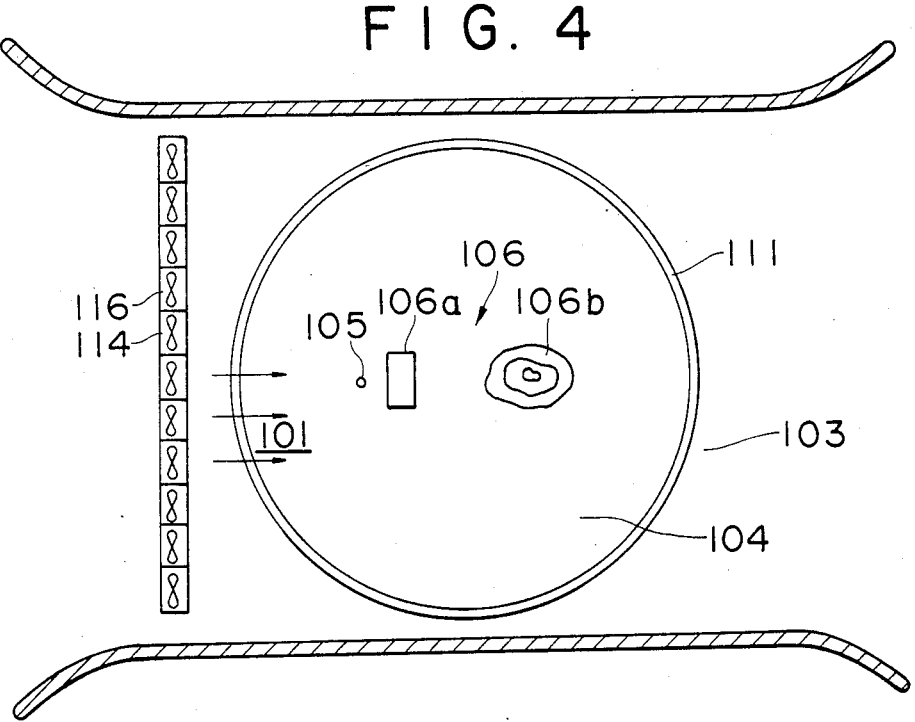
FIG. 4 is a sectional view taken along the line IV—IV in FIG. 3.

Another method for testing a gas diffusion will be described in reference to an apparatus shown in FIGS. 3 and 4.

A topography table 104 is provided in the middle of a floor surface 103 of the wind passage 102 into which there is blown an air stream 101 generated by air blowers 114 disposed between partitions 115, 115 and then rectified into the state of a steady flow. The upper surface of the topography table 104 lies at the same level as the floor surface 103. On the topography table 104, there is placed a so-called topograpy model 106 containing a miniature chimney 105, a miniature building 106a, a miniature mountain 106b and the like, the model chimney 105 being planted through the topography table 104. A side plate of the wind passage 102 is made of a transparent tempered glass so that the interior of the wind passage 102 may be visible therethrough. The air flow 101 is rectified by the partitions 115 and rectifying plates 116. The floor surface 103 is supported by support columns 119 and rolling rollers 113 thereon, the support columns 119 being circularly arranged on the ground 118. Therefore, the wind passage 102 inclusive of the air blowers 114 can be freely rotated in a horizontal plane.

Under the topography table 104, a circumferential plate 109 is provided downward and is immersed in a sealing liquid 110 pooled in a circumferential groove 108 projectingly disposed along and under the circumferential edge of a central opening in the floor surface 103. This constitution thus permits preventing air from leaking out through a space between the floor surface 103 and the topography table 104. The wind passage 102 is rotated by a suitable means not shown, and a tracer gas 107 is discharged from the miniature chimney 105.

Figure 5:
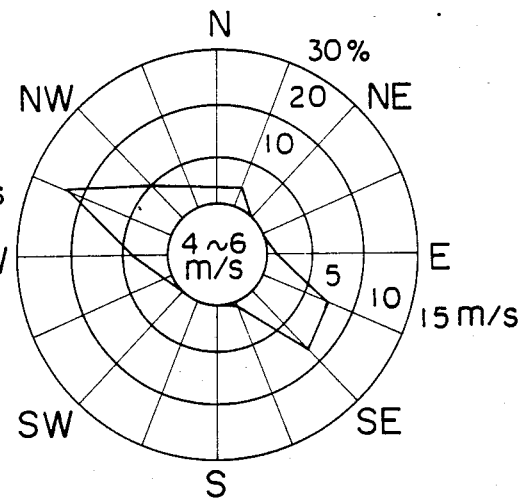
FIG. 5 is a wind rose showing a frequency distribution of a wind direction.

The wind which will blow on the intensive topography model on the topography table 104 can be previously decided as follows:

On a topography on which a chimney is actually disposed or the disposition of the chimney is planned, a wind blowing at, for example, 4 to 6 m/s for one day is measured in 16 directions to prepare a wind rose shown in FIG. 5.

In FIG. 5, the frequency distribution is indicated in terms of percent, and for example, if it is intended that the gas diffusion for one day is carried out in 30 minutes, a value of 1% corresponds to 18 seconds.

Now, the wind having a wind velocity corresponding to an actual 5 m/s velocity is prepared in the wind passage 102 and the latter is rotated evey 22.5° to the surface of the topography table 104 in order to retain the air stream 101 at a predetermined position for a period of time in compliance with the frequency distribution shown in the wind rose in FIG. 5. If the gas diffusion begins with a west wind, the west side of the miniature chimney 105 on the topography table 104 is oriented to the upstream of the air stream 101 in the wind passage 102, and when the wind in the wind tunnel has been stabilized, the tracer gas 107 is then discharged.

First, a diffusion test is continued for 144 (8×18) seconds in this state, and afterward, the wind passage 102 is rotated clockwise as much as 22.5° and this state is maintained for 396 (22×18) seconds. This procedure is successively repeated, and when the wind passage 102 has been rotated once, the diffusion test is over.

Incidentally, FIG. 5 shows the wind rose of the 16 directions (divided every 22.5°), but that of 32 directions (divided every 11.25°) may also be employed optionally, needless to say. The test for investigating the diffusion state of the tracer gas 107 is carried out by, for example, a color change method.

As be apparent from the foregoing, according to the gas diffusion testing method of the present invention, the gas diffusion can be simulated by the average wind blowing from all the directions for, e.g., one day or one month, though the diffusion has heretofore been merely simulated by the one-direction wind.

Next, reference will be made to a gas diffusion testing method taking into consideration not only the wind direction but also the wind velocity. At present, thermoelectric power plants and the like are built on seashores in view of the transport of fuels, the problem of environmental pollution and the like. With regard to weather conditions at the seashore, the wind direction changes as a so-called sea wind and land wind for one day, and for one year, the wind velocity also varies remarkably. Therefore, the average wind velocities of the wind blowing from all the directions are largely different from each other. In such a case, the gas diffusion test in which not only the wind direction but also the wind velocity is considered is necessary.

FIG. 2 exemplarily shows a wind rose containing the wind velocities in the 16 directions. That is to say, the wind rose in FIG. 2 has been prepared by measuring the wind directions and the wind velocities in the 16 directions at many points for a certain period of time, calculating frequencies of the wind directions, and averaging the wind velocities measured in the respective directions. In FIG. 2, the solid line represents the wind direction in terms of percent and the dotted line the wind velocity in terms of m/s.

The test procedure in this case can be carried out in about the same manner as in previously described, but its feature is that the wind velocity of the air stream 101 in the wind tunnel is changed in each direction so as to correspond to the average wind velocity in this direction. The wind velocity may usually be given by regulating a rotational frequency of the air blowers 114, but of course, such a velocity regulation may be accomplished by another way.

Embodiment 3

Figure 6:
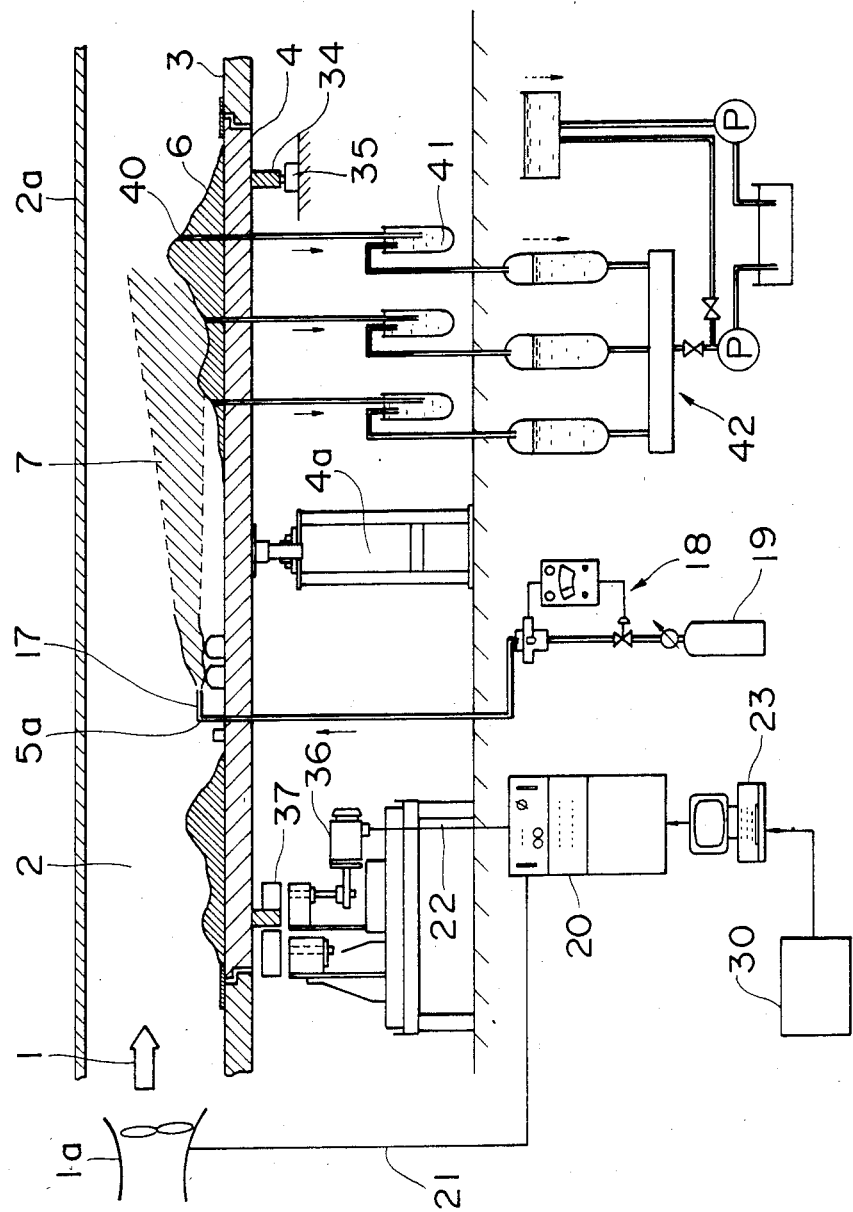
FIG. 6 is a vertical section of a gas diffusion testing apparatus used in a third embodiment.

In FIG. 6, an air stream 1 fed through an air blower 1a is introduced into a wind passage 2 in a wind tunnel. The wind passage 2 is composed of wind passage side walls, a wind passage ceiling 2a and a wind passage floor 3, and has a rectangular shape as seen in a sectional view. A part of the floor 3 constitutes a turntable 4 which can rotate about a rotary center 4a. A travelling foot 34 is attached under the turntable 4 and is put on a circular track 35 with the interposition of rollers not shown. A driving motor 36 works to rotate a driving roll 37 via a reduction gear. This driving roll 37 is contacted with a cylindrical surface of the travelling foot 34 in order to give a rotational force to the turntable 4.

On the top surface of the turntable 4, a topography model 6 of a site to be inspected is disposed, and a discharge pipe 5a for a tracer gas is arragned in the vicinity of the rotary center 4a in place of a chimney. A plurality of gas suction openings 40 are formed on the topography model 6, and these openings 40 are connected to gas sampling tubes 41 which extend to gas suction device 42.

A rotation controlling device 20 is connected to a computer 23 in which weather data of the site are stored, and is further connected to the air blower 1a and the driving motor 36 via connecting wires 21 and 22, respectively.

A time distribution of a wind direction is previously established from weather data 30 of the site and is input in the computer 23. In like manner, the time distribution of a wind velocity is also beforehand established and input therein. A signal from the rotation controlling device 20 is applied to the driving motor 36 to control it and to thereby rotate the turntable 4 on the basis of the time distribution of the wind direction. This corresponds to the change in the direction of the air stream 1 to the topography model 6.

Further, a signal based on the time distribution of the wind velocity already input is applied to the air blower 1a in order to change the rotational frequency of the air blower 1a and to thereby alter the wind velocity in the wind passage 2 of the wind tunnel.

After the time distribution of the wind direction and velocity of the air stream 1 has been caused to coincide with the weather conditions of the actual location, a tracer gas is fed in a controlled amount from a tracer gas bomb 19 to a tracer gas discharge pipe 5a through a flow rate controlling device 18, and the tracer gas 7 is then discharged from the discharge opening 17 as shown in FIG. 6 and diffuses above the topography model 6. The tracer gas 7 which is diffusing above the topography model 6 in compliance with conditions of the wind direction, the wind velocity and the topography is taken in the gas sampling tubes 41 through many gas suction openings 40 formed on the topography model 6, and gas concentrations are then measured at several positions at one time to examine the diffusion state of the gas.

The gas sampling tubes 41 are connected to the gas absorbing device 42, and since a negative pressure is present in the tubes, the sampling operation of the tracer gas is easy.

Figure 7:
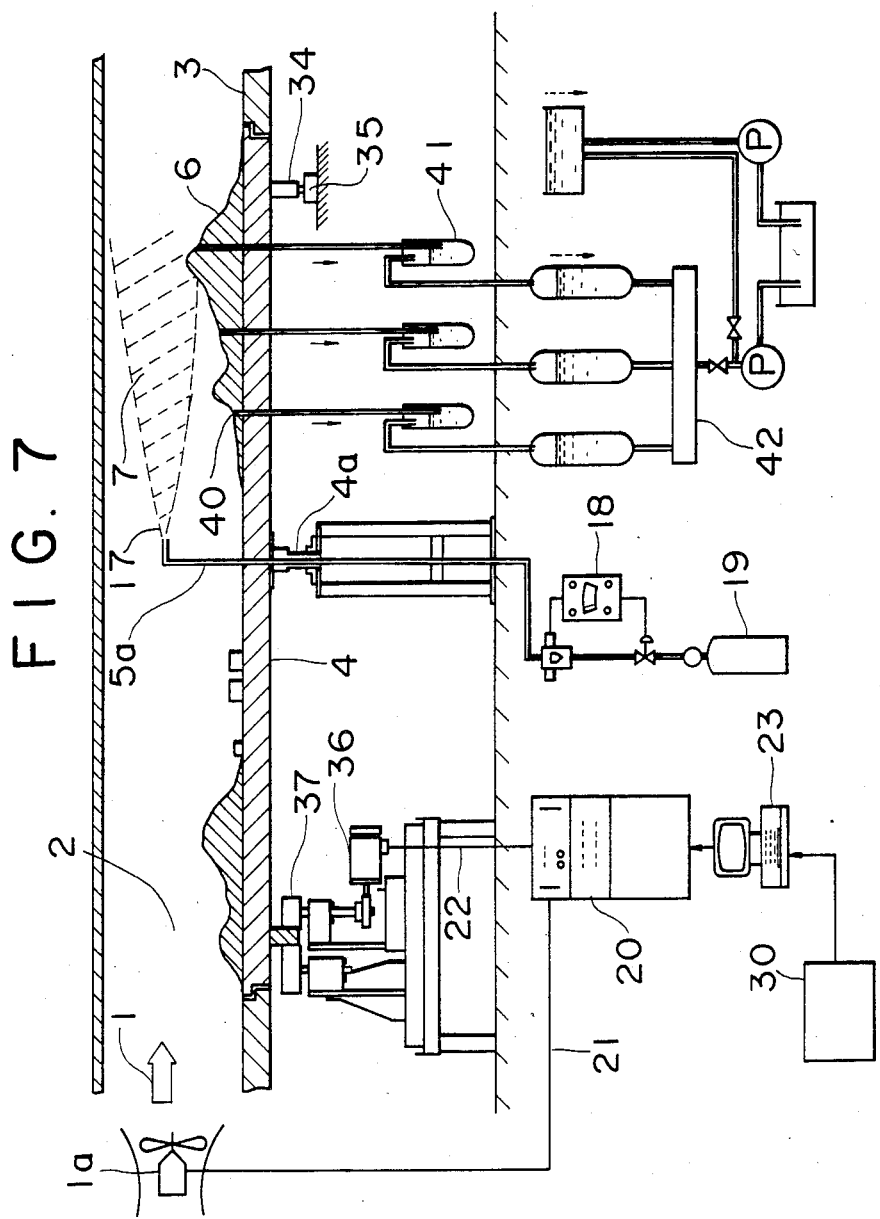
FIG. 7 is a vertical section of another aspect of the gas diffusion testing apparatus in FIG. 6.

FIG. 7 is a vertical section illustrating another aspect of this embodiment regarding the gas diffusion testing apparatus, and in this drawing, a tracer gas discharge pipe 5a is disposed through the rotary center 4a of the turntable 4 of the miniature chimney.

As described above, according to the present invention, the topography model can be rotated and the rotating device can be controlled by the cotrol device to freely regulate the wind direction to the topography model. Further, since the air blower for feeding the wind to the wind tunnel can be controlled to suitably change its rotational frequency and to thereby control the wind velocity.

Embodiment 4

Figure 9:
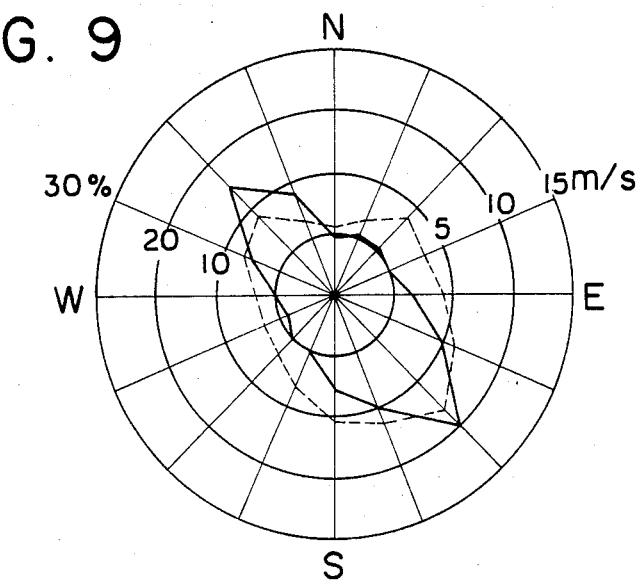
FIG. 9 is a wind rose regarding a topography model in the third embodiment.

FIG. 9 shows one example of a wind rose regarding the topography model in Embodiment 3.

This drawing indicates a frequency distribution in 16 directions, and a solid line therein represents a wind direction frequency and a dotted line therein an average wind velocity in each wind direction. For example, when a gas diffusion for one day is tested in 30 minutes (1,800 seconds), 1% of an outer periphery of a turntable corresponds to 18 seconds. An air stream having a certain wind velocity is prepared in a wind tunnel, and the turntable is rotated every 22.5° (360°/16) and is retained at a certain position for a time corresponding to the frequency of the wind rose in FIG. 9. For this period of time, the average wind velocity indicated by the dotted line is retained.

In order to investigate the gas diffusion state, it is necessary to rotate the topography model as described above, and such a gas diffusion testing apparatus has been utilized to simulate the change in the wind direction.

However, in the apparatus, a topography around an opening for discharging an exhaust gas therethrough is different at the respective points. For example, in the case of the diffusion test of the gas from a chimney in a factory built on a seashore as exhibited in the plan view of FIG. 4, environmental conditions and test conditions are noticeably different from those of FIG. 7.

Figure 10:
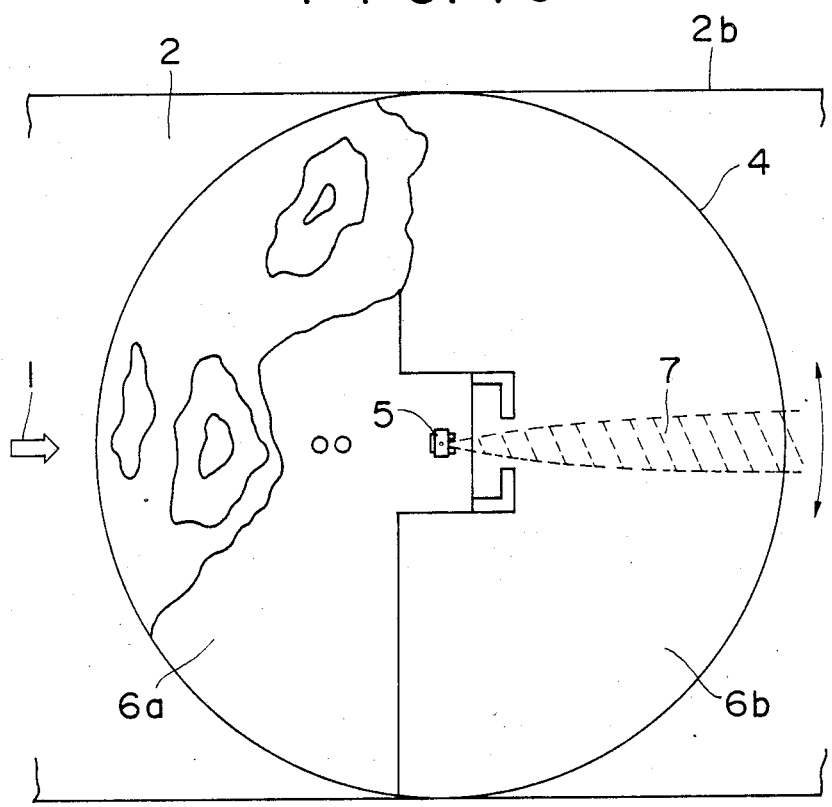
FIG. 10 is a plan view showing the topography model of a factory(area on a shore.

That is to say, in the case of FIG. 10, a turntable 4 disposed in a wind passage 2 surrounded by a wind passage side wall 2b has a miniature land 6a containing a shoreline and a miniature ocean portion 6b having no projections thereon, and a tracer gas 7 discharged from a miniature chimney 5 is diffused above the miniature ocean portion 6b by an air stream 1 represented by an arrow.

In a conventional gas diffusion test, a discharge rate of the tracer gas 7 is adjusted so as to become constant, but the discharge of the gas toward the ocean portion having no problems of environmental pollution differs largely from that of the gas toward an urban district and a farmland in which the pollution must be considered. Further, a throughput of a factory or a power station is variant and components of an exhaust gas also are distinct, and it thus is important to control these factors, taking the wind direction into consideration.

This embodiment will be described in reference to FIG. 8 which shows a vertical section of an apparatus used therein.

Figure 8:
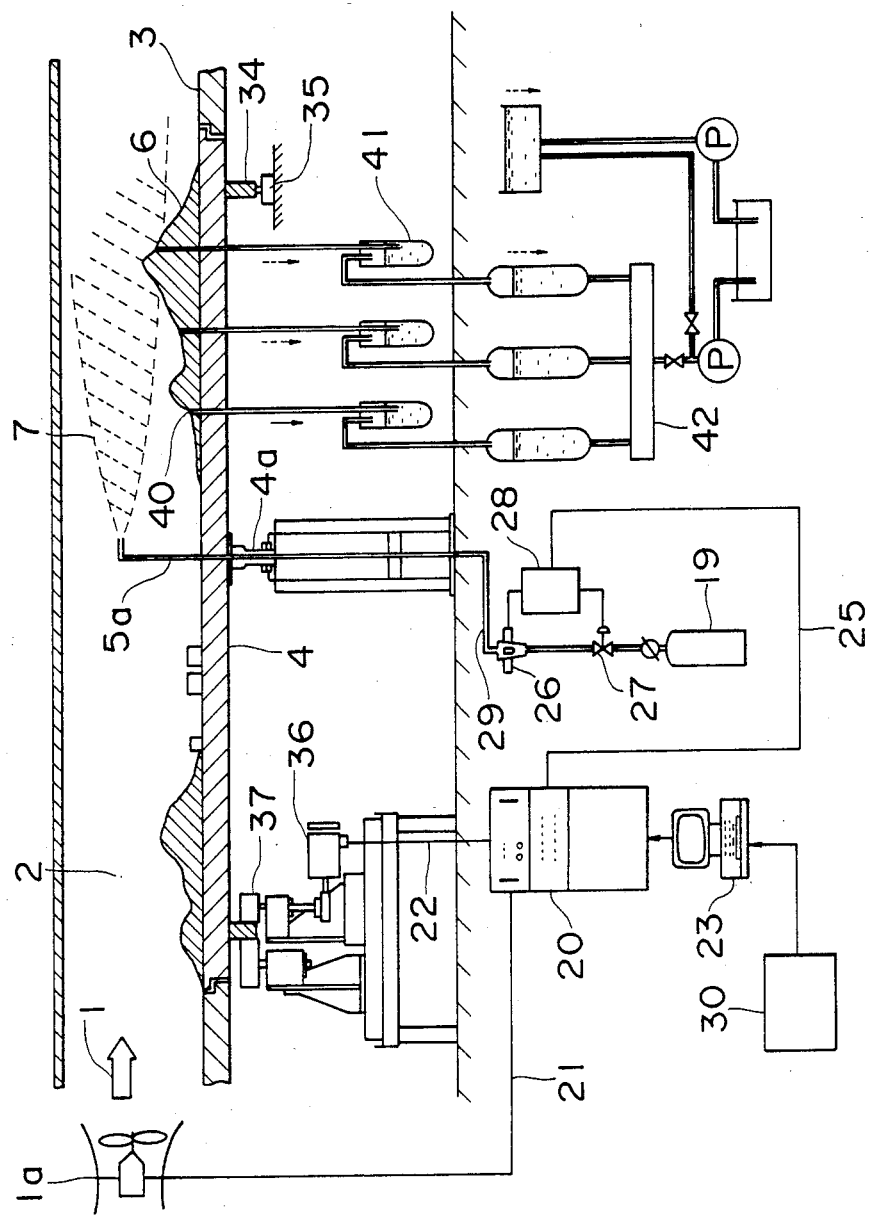
FIG. 8 is a vertical section of a gas diffusion testing apparatus used in a fourth embodiment.

The same numerals in FIG. 8 as in FIG. 7 represent the same members therein. An adjuster device for adjusting a discharge rate of a tracer gas 7 is composed of a control device 20, a computer 23 connecting to the control device 20 and storing weather data of an actual location, a flow rate control device 28 connecting to the control device 20 via a connecting wire 25, a flow rate meter 26 with a transmitter disposed on a tracer gas pipe 29 for leading the tracer gas 7 from the tracer gas bomb 19 to a discharge pipe 5a, and an electromagnetic flow rate control valve 27.

In such an apparatus, the turntable 4 is rotated so as to obtain a desired wind direction by a signal from the control device 20. Simultaneously, a command regarding a gas discharge rate in compliance with the above-mentioned wind direction is transmitted to the flow rate control device 28, and a signal fed back from the flow rate meter 26 adjusts an open degree of the electromagnetic flow rate cotrol valve 27 in order to maintain a predetermined relation between the wind direction and the gas flow rate.

According to such an apparatus, in a power station or a garbage furnace in which the same kind of fuel is used, the wind direction and a tolerance of the exhaust gas can be realized before its construction, and in a factory for discharging the exhaust gas containing components which vary with works to be done, a relation between the wind direction and the works can be perceived, whereby environmental pollution can be prevented beforehand.

Additionally, in the above-mentioned embodiment, an output of the air blower may be variable, and when the distribution state of the diffused tracer gas is tested, the tracer gas discharge pipe may be moved upward and downward in response to the wind direction or the wind velocity.

As be definite from the above, the present invention can provide the gas diffusion testing apparatus in which the discharge rate of the tracer gas can be altered in compliance with the wind direction.

Embodiment 5

In the wind rose in FIG. 9 regarding the topography model in Embodiment 3, the frequency distribution of 16 directions is shown, and a solid line in the wind rose represents the wind frequency and a dotted line the average wind velocity of each wind direction. For example, when a gas diffusion for one day is tested in 30 minutes (1,800 seconds), 1% of the outer periphery of a turntable corresponds to 18 seconds. An air stream having a certain wind velocity is prepared in a wind tunnel, and the turntable 4 is rotated every 22.5° (360°/16) and is retained at a certain position for a time corresponding to the frequency of the wind rose in FIG. 9. For this period of time, the average wind velocity indicated by the dotted line is retained.

Figure 12:
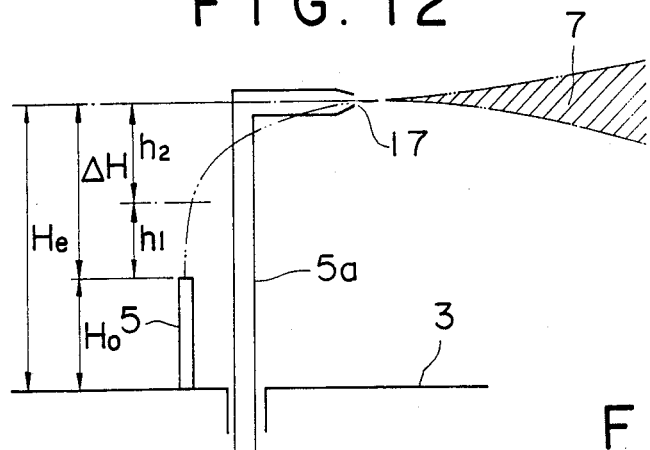
FIG. 12 is an illustrative view regarding an effective chimney height.

However, smoke given off from an exhaust nozzle of a tunnel or heat discharged from a cleaning tower is generally blown up in the atmosphere, rises with the aids of momentum and buoyancy, and then flows leeward on the wind while diffused. Accordingly, it is important that an expansion of the exhaust smoke is tested and measured by discharging a specific gas, i.e., a tracer gas 7 (corresponding to the exhaust smoke) discharged from a discharge opening 17 disposed at an effective chimney height ($He = Ho + \Delta H$) of a height Ho of the miniature chimney itself 5 plus the total height $\Delta H$ of a height h1 of the upward blown smoke and a height h2 of the floatingly rised smoke, as shown in an illustrave view about the effective chimney height of FIG. 12.

Figure 13:
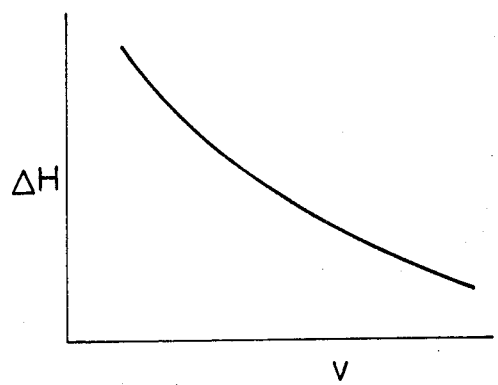
FIG. 13 is a diagram showing a relation between a rising height of smoke and a wind velocity.
Figure 14:
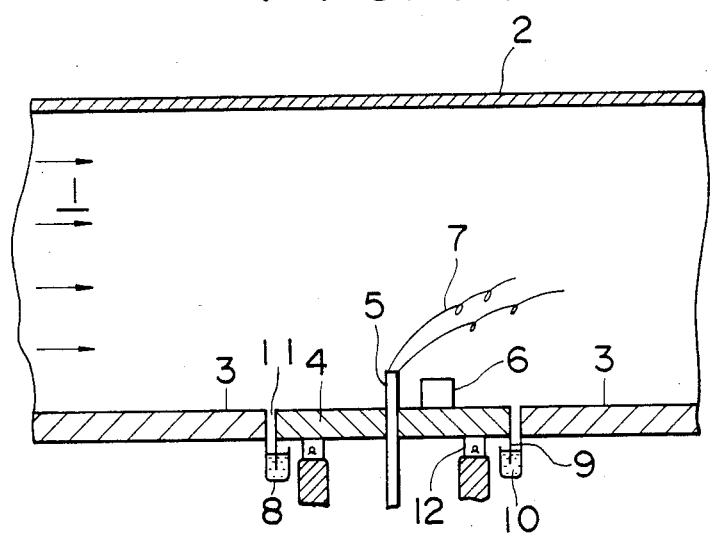
FIG. 14 is an illustrative view of an apparatus used in a conventional method for testing a gas diffusion.

It is known that the height ΔH varies with smoke discharge conditions (an upward discharge velocity and a discharge flow rate) and the wind velocity v as shown in FIG. 13. As a formula for representing the rise of the smoke, for example, the Bosanquet formula is already put into practice.

Accordingly, in the case that the test of the chimney is carried out under the decided smoke discharge conditions, it is important to test the diffusion state by changing the effective height He of the discharge opening 17 every time the wind velocity is altered. In a conventional apparatus, however, the height of a miniature chimney is based on a reduced scale ratio of a topography, and thus, under the conditions that the effective chimney height He is changed, the diffusion test has not been carried out.

This embodiment will be described in reference to FIG. 11.

Figure 11:
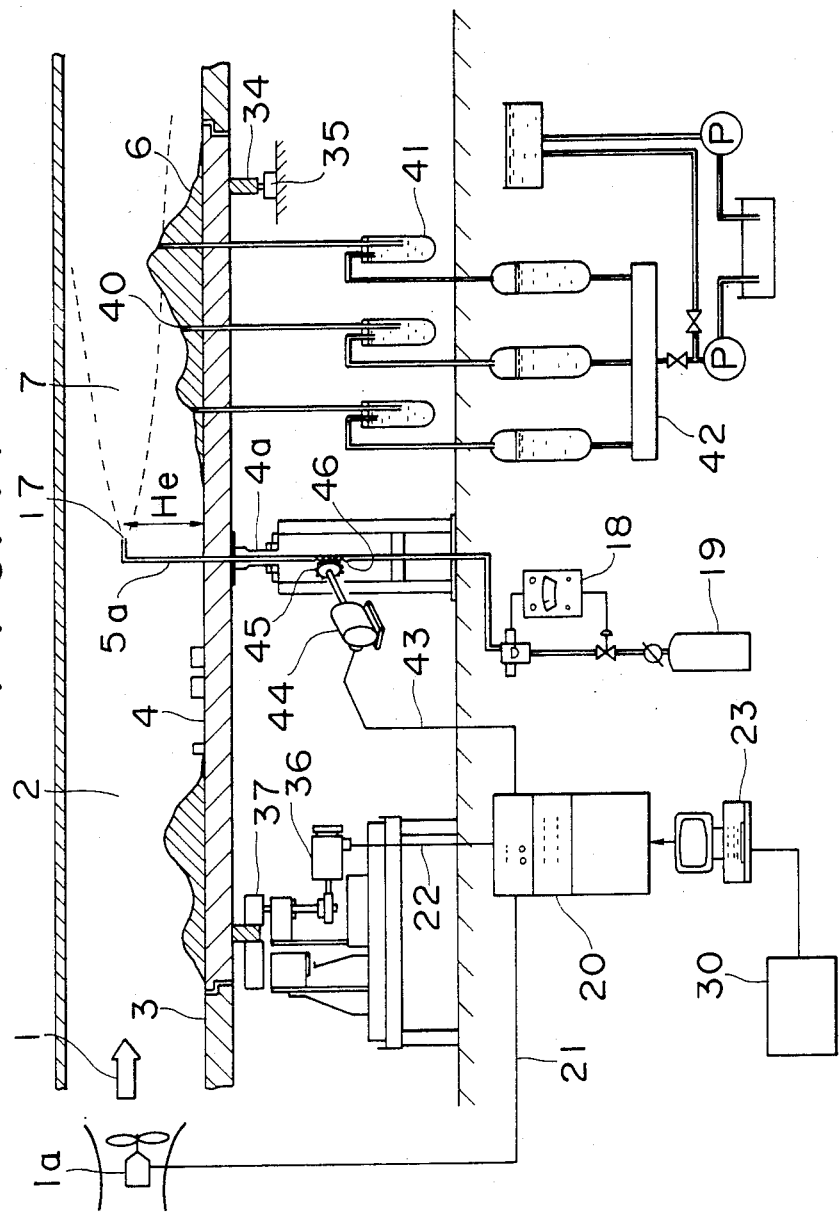
FIG. 11 is a vertical section showing a gas diffusion testing apparatus used in a fifth embodiment.

The same numerals in FIG. 11 as in FIG. 7 represent the same members therein. In an apparatus shown in FIG. 11, a rotation control device 20 is connected to a computer 23 in which weather data 30 of an actual location are stored, and a pulse motor 44 receives a signal from the rotation control device 20 through a connecting wire 43 and is driven thereby. A pinion 45 attached to an axial end portion of the pulse motor 44 is adapted to engage with a rack 46 mounted on a lower portion of a discharge pipe 5a extending through the center of a rotary shaft 4a under a turntable 4.

A time distribution of a wind direction and a wind velocity for such a constitution is established from the weather data of the site as shown in FIG. 9, and the wind velocity is adjusted by controlling a rotation of the turntable 4 and a rotational frequency of the air blower 1a. Further, the height He of the tracer gas discharge opening 17 of the miniature chimney 5 is adjusted on the basis of a relation between the wind velocity and the discharge height shown in FIG. 13.

Under such conditions of the wind direction, the wind velocity, the gas discharge height and the topography, the tracer gas 7 which is diffusing above a topography model 6 is taken in gas sampling tubes 41 from many gas suction openings 40, and gas concentrations are measured at several points at one time in order to examine the gas disffusion state.

According to such a constitution, the time distribution of the wind direction and the wind velocity corresponding to the actual weather conditions of the site can be reproduced on a laboratory scale, and the accurate exhaust gas diffusion state can be realized by properly simulating the discharge height of the tracer gas.

In addition, when the distribution state of the diffused tracer gas is tested, a discharge rate of the tracer gas may be controlled in compliance with the rotation angle of the turntable and/or the wind velocity.

As described above, the present invention can provide the apparatus for testing the gas diffusion in which the height of the tracer gas discharge pipe can be adjusted in response to the wind velocity.

While the typical preferred embodiments of the present invention has been described fully hereinbefore, it is to be understood that the present invention is not intended to be restricted to the details of the specific constructions shown in the preferred embodiments, but to contrary, many changes and modifications may be made in the foregoing teachings without any restriction thereto and without departing from the spirit and scope of the invention.

What is claimed is:

1. A method for testing a gas diffusion which comprises the steps of rotatably disposing a topography model in a wind passage of a wind tunnel; previously establishing a time distribution of a direction and a velocity of a wind blowing on the topography; rotating the topography model by a rotating means on the basis of the time distribution; discharging a tracer gas from a predetermined position of the topography model by a tracer gas discharging means while changing the wind velocity in the wind tunnel by an air blowing means; and testing a diffusion state of the tracer gas.

2. A method for testing a gas diffusion which comprises the steps of rotatably disposing a topography model in a wind passage of a wind tunnel; previously establishing a time distribution of a direction and a velocity of a wind blowing on the topography; rotating the topography model by a rotating means on the basis of the time distribution; discharging a tracer gas from a predetermined position of the topography model by a tracer gas discharging means while changing the wind velocity in the wind tunnel; and testing a diffusion state of the tracer gas; the method being characterized by setting a discharge height of the tracer gas at a predetermined level in compliance with the wind velocity by a height control means.

3. A method for testing a gas diffusion which comprises disposing a topography model in a wind passage of a wind tunnel; discharging a tracer gas from a predetermined position of the topography model; and testing the diffusion state of the tracer gas; the method being characterized by rendering the topography mold stationary and the wind passage rotatable; previously establishing a time distribution of the direction of a blowing wind; and rotating the wind passage on the basis of the time distribution of the wind direction by a rotating means.

4. A method for testing a gas diffusion which comprises disposing a topography model in a wind passage of a wind tunnel; discharging a tracer gas from a predetermined position of the topography model; and testing the diffusion state of the tracer gas; the method being characterized by rendering the topography mold stationary and the wind passage rotatable; previously establishing a time distribution of the direction and the velocity of a blowing wind; rotating the wind passage on the basis of the time distribution of the wind direction by a rotating means; and changing the wind velocity in the wind passage by a wind blowing means.

5. An apparatus for testing a gas diffusion which comprises a topography model rotatably disposed in a wind passage in a wind tunnel; a rotating means for rotating the topography model; a wind blowing means for blowing a wind into the wind tunnel; a gas discharge means for discharging a tracer gas from a predetermined position of the topography model; and a cotrol means for controlling the rotating means and the wind blowing means.

6. An apparatus for testing a gas diffusion which comprises a topography model rotatably disposed in a wind passage of a wind tunnel; a rotating means for rotating the topography model; and a gas discharge means for discharging the tracer gas from a predetermined position of the topography model; whereby the tracer gas diffusion is tested at various rotation angles of the topography model; the apparatus being characterized by further having a tracer gas discharge rate controlling means for controlling a discharge rate of the tracer gas.

7. An apparatus for testing a gas diffusion which comprises a topography model rotatably disposed in a wind passage of a wind tunnel; a rotating means for rotating the topography model; and a tracer gas discharge pipe, uprightly disposed on the topography model, for discharging the tracer gas; whereby the tracer gas diffusion is tested at various rotation angles of the topography model; the apparatus being characterized by further having a tracer gas discharge pipe lifting means for lifting the tracer gas discharge pipe in compliance with a wind velocity.

* * * * *